US010850911B2

(12) United States Patent
Sabin et al.

(10) Patent No.: US 10,850,911 B2
(45) Date of Patent: Dec. 1, 2020

(54) PRODUCT HEATING WITH SOLUBLE CONTAINER

(71) Applicant: Tempra Technology, Inc., Bradenton, FL (US)

(72) Inventors: Cullen M Sabin, Bradenton, FL (US); Alan James Maskell, Venice, FL (US)

(73) Assignee: Tempra Technology, Inc., Bradenton, FL (US)

( * ) Notice: Subject to any disclaimer, the term of this patent is extended or adjusted under 35 U.S.C. 154(b) by 396 days.

(21) Appl. No.: 15/309,823

(22) PCT Filed: May 11, 2015

(86) PCT No.: PCT/US2015/030077
§ 371 (c)(1),
(2) Date: Nov. 9, 2016

(87) PCT Pub. No.: WO2015/175371
PCT Pub. Date: Nov. 19, 2015

(65) Prior Publication Data
US 2017/0267437 A1   Sep. 21, 2017

Related U.S. Application Data

(60) Provisional application No. 61/992,422, filed on May 13, 2014.

(51) Int. Cl.
*B65D 81/34* (2006.01)
*F24V 30/00* (2018.01)
(Continued)

(52) U.S. Cl.
CPC ...... *B65D 81/3484* (2013.01); *A47J 41/0044* (2013.01); *B65D 43/02* (2013.01); *B65D 77/048* (2013.01); *F24V 30/00* (2018.05)

(58) Field of Classification Search
CPC .................. B65D 25/34; B65D 47/06
(Continued)

(56) References Cited

U.S. PATENT DOCUMENTS 2,300,793 A     11/1942   Martin
3,561,424 A  *  2/1971   Failla ...................... A47J 36/28
                                              126/263.09
(Continued)

FOREIGN PATENT DOCUMENTS

CN      2124206      12/1992
CN      2178700 Y    10/1994
(Continued)

OTHER PUBLICATIONS

European Search Report and Written Opinion for EP 15792228.7, dated Oct. 23, 2017.
(Continued)

*Primary Examiner* — Steven B McAllister
*Assistant Examiner* — John E Bargero
(74) *Attorney, Agent, or Firm* — Sheehan Phinney Bass & Green PA

(57) ABSTRACT

A self-heating container includes a first substance and a second substance that are adapted to produce an exothermic reaction upon contact with each other, a soluble material between the first substance and the second substance, a frangible membrane physically separating the second substance from the soluble material, and a means for rupturing the frangible membrane.

15 Claims, 8 Drawing Sheets

(51) Int. Cl.
*A47J 41/00* (2006.01)
*B65D 43/02* (2006.01)
*B65D 77/04* (2006.01)

(58) Field of Classification Search
USPC .................................................... 126/263.09
See application file for complete search history.

(56) References Cited

U.S. PATENT DOCUMENTS

| | | | | |
|---|---|---|---|---|
| 3,970,068 | A | * | 7/1976 | Sato ........................ A47J 36/28 |
| | | | | 126/263.08 |
| 4,306,556 | A | | 12/1981 | Zelman |
| 4,753,085 | A | * | 6/1988 | Labrousse ................. F25D 5/02 |
| | | | | 126/263.08 |
| 5,388,565 | A | * | 2/1995 | Ou .......................... A47J 36/28 |
| | | | | 126/262 |
| 6,079,405 | A | * | 6/2000 | Justo .................... A47J 36/2411 |
| | | | | 126/263.08 |
| 6,116,231 | A | | 9/2000 | Sabin et al. |
| 6,481,470 | B1 | | 11/2002 | Rubenic |
| 7,722,782 | B2 | | 5/2010 | Coffey et al. |
| 2008/0000898 | A1 | | 1/2008 | Ramsden |
| 2010/0239877 | A1 | | 9/2010 | Paul et al. |
| 2011/0206573 | A1 | | 8/2011 | Ackley et al. |
| 2014/0358206 | A1 | * | 12/2014 | Hirokane .................. A61F 7/03 |
| | | | | 607/109 |

FOREIGN PATENT DOCUMENTS

| | | |
|---|---|---|
| CN | 2450142 | 9/2001 |
| CN | 103287735 | 9/2013 |
| GB | 2178161 A | 2/1987 |
| JP | S62 135172 A | 6/1987 |
| JP | H01-213179 | 8/1989 |
| JP | H6-271842 | 9/1994 |
| WO | 97/00637 A1 | 1/1997 |
| WO | 2005008411 | 1/2005 |
| WO | 2005069721 | 8/2005 |
| WO | 2010059636 A2 | 5/2010 |

OTHER PUBLICATIONS

International Search Report and Written Opinion for PCT/US15/30077, dated Aug. 18, 2015.
Chinese Office Action dated Jun. 4, 2018 for CN201580036869.4.
English Machine Translation of JPH01-213179.
English machine Translation of JPH6-271842.

* cited by examiner

PRODUCT HEATING WITH SOLUBLE CONTAINER

CROSS-REFERENCE TO RELATED APPLICATIONS

This application claims the benefit of priority to U.S. Provisional Patent Application No. 61/992,422, entitled, Mixing Chemicals Employing One of More Soluble Bagged Components, which was filed on May 13, 2014, and is a national stage entry of PCT/US15/30077, entitled Product Heating With Soluble Container, which was filed on May 11, 2015. The disclosure of the prior applications are incorporated by reference herein in their entirety.

FIELD OF THE INVENTION

This disclosure relates to mixing chemicals employing one or more soluble bagged components and, more particularly, relates to mixing to create an exothermic reaction for heating food or other products.

BACKGROUND

The present disclosure relates to consumer products that employ a chemical reaction in order to produce heat for warming a product or an object. Typical among these is a self-heating beverage cup, such as that described in U.S. Pat. No. 7,722,782. In some implementations, these devices utilize a multiple reactants that mix to produce an exothermic reaction.

Market surveys have shown that consumers who are waiting for a hot cup of coffee, for example, become impatient within four to five minutes. It is desirable, therefore, for a product, such as coffee, to be capable of beginning (and completing) the heating process very quickly in order to satisfy consumers. In a typical implementation, the techniques and processes described herein provide this and other capabilities.

SUMMARY OF THE INVENTION

In one aspect, a self-heating container includes a first substance and a second substance that are adapted to produce an exothermic reaction upon contact with each other, a soluble material between the first substance and the second substance, a frangible membrane physically separating the second substance from the soluble material, and a means for rupturing the frangible membrane.

In another aspect, a self-heating container includes a first substance and a second substance that are adapted to produce an exothermic reaction upon contact with each other. There is a soluble material that, when intact, surrounds the first substance. The soluble material is adapted to dissolve upon contact with the second substance. A frangible membrane physically separates the second substance from the soluble material. The frangible membrane is not soluble in second substance. A means for rupturing the frangible membrane is provided. Rupturing the frangible membrane compromises the physical separation between the second substance and the soluble material, thereby enabling the second substance to contact the soluble material. Contact between the second substance and the soluble material causes the soluble material to dissolve and dissolving the soluble material enables the second substance to contact the first substance and thereby produce the exothermic reaction. The first substance is above the second substance when the frangible membrane is intact and the self-heating container is in an upright configuration and wherein the first substance is granular and the second substance is a liquid.

In yet another aspect, a method of heating a product includes providing a self-heating container. The self-heating container includes a first substance and a second substance that are adapted to produce an exothermic reaction upon contact with each other, a soluble material between the first substance and the second substance, a frangible membrane physically separating the second substance from the soluble material, and a means for rupturing the frangible membrane. The method further includes rupturing the frangible membrane.

In still another aspect, a self-heating container includes a soluble container containing a first substance and a second substance physically separated from the soluble container by a frangible membrane. The first substance and the second substance are adapted so as to exothermically react when they come into physical contact with one another. The self-heating container has a means (e.g., a cutting element, puncturing device or the like) for rupturing the frangible membrane. Rupturing the frangible membrane allows the second substance to contact the soluble container, and the second substance dissolves the soluble container when the second substance comes into contact with the soluble container.

In yet another aspect, a method of heating a product contained in a self-heating container is disclosed. The method includes containing a first substance in a soluble container, and containing a second substance physically separated from the first substance by a frangible membrane. The first substance and the second substance are adapted to exothermically react when they come into physical contact with one another. The method includes rupturing the frangible membrane to allow the second substance to contact and dissolve the soluble container.

In some implementations, one or more of the following advantages are present.

For example, a self-heating container can be provided that is able to heat food, beverage or other products contained within the self-heating container very thoroughly and quickly. In a typical implementation, this is accomplished using a relatively simple arrangement of components that is relatively easy to produce and robust.

As another example, the self-heating containers described herein can be stored for long periods of time before activation/use. Moreover, the self-heating containers store can the individual reactants in separate compartments for extended periods of time in a way which is simple to construct and assemble without losing their efficacy. The package is therefore storeable and shippable (including by air) without significant risk of failure.

Additionally, the self-heating containers described herein have the ability to control the temperature of the finished product and deliver a consistent safe product to the end consumer.

Other features and advantages will be apparent from the description and drawings, and from the claims.

BRIEF DESCRIPTION OF THE DRAWINGS

Like reference characters refer to like elements.

DETAILED DESCRIPTION

Figure 1:
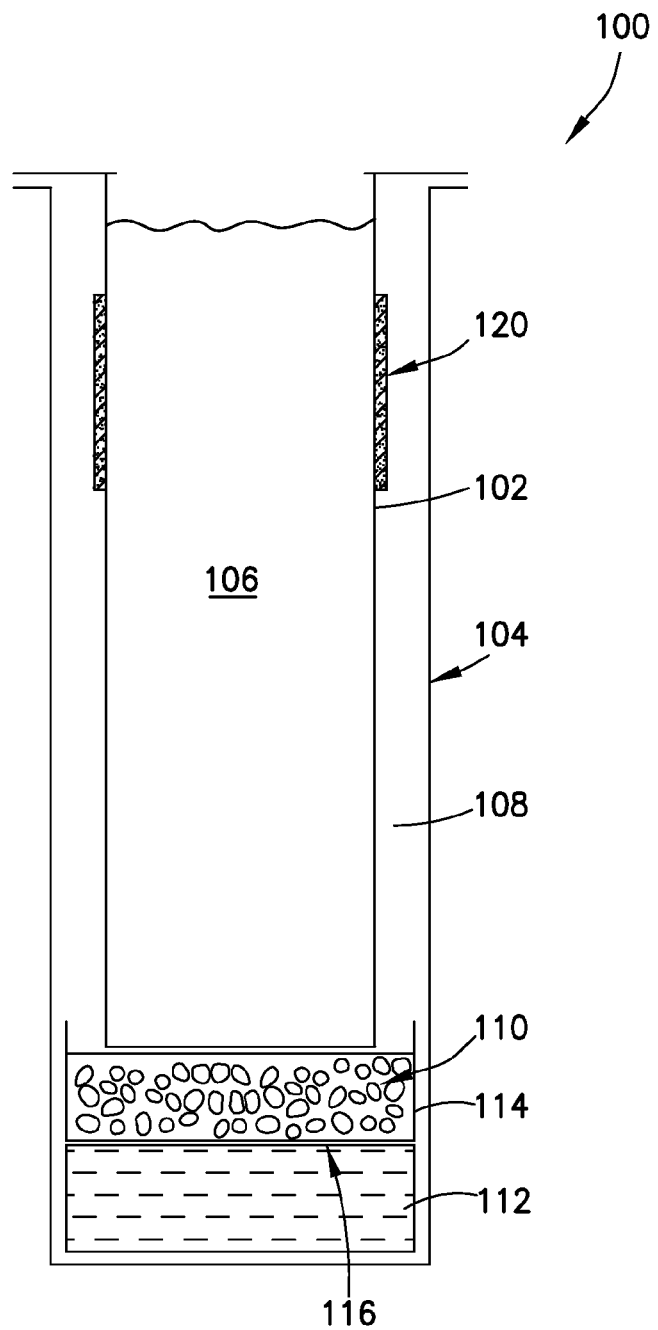
FIG. 1 is a partial, cross-sectional side view of an exemplary implementation of a self-heating container.

FIG. 1 is a partial, schematic cross-sectional side view of an exemplary implementation of a self-heating container 100.

The illustrated self-heating container 100 has an inner cup 102 configured to hold a product 106 to be heated, and an outer cup 104 that surrounds at least part of the inner cup 102.

In the illustrated implementation, the inner cup 102 has a flat bottom and a substantially cylindrical side wall. There is typically a removable cover (not shown in FIG. 1) at the upper open end of the inner cup 102 that can seal the inner product compartment. The inner cup can be made from a variety of different materials or combinations of materials. Typically, the inner cup 102 has a relatively high degree of thermal-conductivity and may be made from a metallic material or the like.

In the illustrated implementation, the outer cup 104 has a flat bottom and a substantially cylindrical side wall that is substantially concentric relative to the substantially cylindrical side wall of the inner cup 102.

In a typical implementation, the product 106 to be heated is a food or a beverage. However, it is possible for the concepts disclosed herein to be used for applications that involve heating other substances (e.g., cement, etc.) that are not foods or beverages.

There is a space 108 between the inner cup 102 and the outer cup 104 that accommodates an exothermic chemical reaction to heat the product 106 inside the inner cup 102. In a typical implementation, the exothermic chemical reaction occurs when a first substance 110 (e.g., a first reactant) comes into contact with a second substance 112 (e.g., a second reactant) inside the reaction space 108. In a typical implementation, the first substance 110 is substantially granular and the second substance is a liquid. In one example, the first substance 110 includes an oxidizer, such as sodium permanganate, potassium permanganate or calcium permanganate, and the second substance 112 includes a reducing agent, which may be a polyhydroxy organic compound, such as ethylene glycol, glycerine or propylene glycol.

The reaction space 108 has an annular portion between the substantially cylindrical walls of the inner cup 102 and outer cup 104, and a disk-shaped base portion between the flat bottom surface of the inner cup 102 and the flat bottom surface of the outer cup 104. The reaction space 108, however, can have any one of a variety of different physical configurations, as long as the reaction space 108 is thermally coupled to the product 106 to be heated.

In the illustrated implementation, the first substance 110 is inside a container 114 just below the inner cup 102 inside the reaction space 108. In a typical implementation, that container 114 is made from a soluble material that is adapted to dissolve in response to contacting the second substance 112. Therefore, in a typical implementation, the second substance 112 is or contains a solvent for the soluble container 114 such that the soluble container 114 will dissolve, or at least begin to dissolve upon contact with the second substance 112.

In general, the soluble container 114 should have the physical strength to withstand the actions necessary in filling, sealing, installing, and shipping. Additionally, the soluble container should be able to be destroyed in a few seconds at a temperature significantly below room temperature. Mechanical means can also be used to help break the soluble container 114.

The second substance 112 is physically separated from the soluble container 114 by a frangible membrane 116. In general, the frangible membrane 116 is a solid membrane that is substantially impermeable to the second substance 112. Moreover, the frangible membrane 116 is adapted so that it can be ruptured (i.e., cut, ripped, torn, pierced, punctured, broken, or otherwise structurally impaired) by a means for rupturing the frangible membrane (not shown in FIG. 1) to terminate the physical separation between the second substance 112 and the soluble container 114. In a typical implementation, the means for rupturing the frangible membrane is located inside the reaction space 108, near the frangible membrane 116.

The frangible membrane 116 can take any one of a variety of different forms. In one example, such as the one illustrated in FIG. 1, the frangible membrane 116 is a plastic pouch that surrounds and contains the second substance 112. In another example, the frangible membrane 116 is a foil cover on a plastic cup that contains the second substance 112. In yet another example, the frangible membrane 116 is a foil or plastic sheet that seals against the entire inner perimeter of the substantially cylindrical wall of the outer cup 104 to define an isolated compartment near the bottom of the self-heating container that contains the second substance 112. There are numerous other possible configurations for the frangible seal 116 and/or a container for holding the second substance 112.

In the illustrated implementation, with the self-heating container 100 in an upright position, the frangible membrane 116 is beneath the soluble container 114 (i.e., the plastic pouch) and the second substance 112 is inside the frangible membrane. Other arrangements are possible including, for example, arrangements in which the soluble container 114 and the plastic pouch are side-by-side, or arrangements in which the soluble container 114 is beneath the frangible plastic pouch.

The means for rupturing the frangible membrane can be virtually any kind of structural element or combination of structural elements that, alone or collectively, is/are able to rupture (i.e., cut, rip, tear, pierce, puncture, punch or otherwise compromise the structural integrity of) the frangible membrane 116. The means for rupturing the frangible membrane can include, for example, a circular saw or cutting blade, a spike, a circular punch, hinged teeth that pivot to tear into the frangible membrane, etc. In fact, in some implementations, the means for rupturing the frangible membrane is merely two surfaces inside the self-heating container 100 (e.g., the flat bottom surface of the inner cup 102 and the flat bottom surface of the outer cup 104) that can move toward one another to squeeze the plastic pouch (holding the liquid second reactant) until it ruptures. Other variations are possible for the means for rupturing the frangible membrane as well.

To operate the self-heating container 100, in a typical implementation, a human user would first perform some initiating action. In general, the action required to initiate heating would depend on the specific design of the overall self-heating container 100, but the effect would generally be the same to cause the means for rupturing the frangible membrane to rupture the frangible membrane 116.

The requisite initiating action can be any one of a wide variety of possible actions, but would generally involve the human user manipulating, by hand, some structural feature or combination of features on the self-heating container 100. One example includes twisting one portion of the self-heating container 100 (e.g., a cap) relative to another portion of the self-heating container 100 (e.g., a body), thereby causing the inner cup 102 to move in a downward axial direction relative to the outer cup 104. A variety of other actions are possible to initiate heating of the product 106 in the self-heating container 100.

In a typical implementation, in response to the user taking the requisite initiating action, the means for rupturing the frangible membrane ruptures the frangible membrane 116. This essentially terminates the physical separation between the second substance 112 and the soluble container 114 and thereby enables the second substance 112 to come into direct physical contact with the soluble container 114.

Once the second substance 112 comes into contact with the soluble container 114, the soluble container 114 begins to dissolve, thereby exposing the first substance 110, originally inside the soluble container 114, to the second substance 112. Contact between the second substance 112 and the first substance 110 begins the exothermic reaction.

In a typical implementation, once the frangible membrane 116 has been ruptured, the weight of the first substance 110, in the soluble container 114, bears down on the ruptured frangible membrane to help press the liquid second substance 112 out from the ruptured frangible pouch 116 using gravity.

As the exothermic reaction continues, the soluble container 114 continues to dissolve, exposing more and more of the granular first substance 110 to the liquid second substance 112, which increases heat generation. In general, during the initial stages of the exothermic reaction at least, the more intermixing and contact that occurs between the first substance 110 and the second substance 112, the more heat is generated by the resulting exothermic reaction. Moreover, in some implementations, increased heat from the exothermic reaction can accelerate the rate at which the soluble container 114 dissolves.

The exothermic reaction continues producing heat in the reaction space 108. A portion of the heat generated by the exothermic chemical reaction passes through the thermally-conductive inner cup 102 of the self-heating container 100 to the product 106 contained therein. This causes the temperature of the product 106 to increase. In some implementations, the outer cup is thermally insulating to prevent or minimize heat loss out through it. Eventually, the product 106 reaches a desired, target temperature. In a typical implementation, such as the one shown in FIG. 1, the self-heating container 100 is specifically adapted to temper or quench the exothermic reaction when the product reaches the desired target temperature so that the product temperature does not increase to undesirable or potentially hazardous temperature levels.

In this regard, there is a fusible material 120 adhered to an outer surface of the substantially cylindrical wall of the inner cup 102 inside the reaction space 108. In a typical implementation, the fusible material 120 contains a reactant suppressant that can suppress (e.g., temper or quench) the exothermic reaction when the reactant suppressant contacts the reactants. In the illustrated implementation, the fusible material 120 is in the form of a wax ring. However, the fusible material can be any one of a variety of different shapes or sizes.

The reactant suppressant can be virtually any kind of reactant suppressant (i.e., a substance or combination of substances that, if immersed in the exothermic reaction, quenches or at least reduces the intensity of and amount of heat being produced by the exothermic reaction). One example of a reactant suppressant is borax. In one exemplary implementation, the fusible material can be a wax ring having a melting temperature of approximately 67 degrees C., with a thickness of approximately 0.3 cm and a height of approximately 3.5 cm, containing approximately 10 g of borax.

Typically, the self-heating container 100 is able to produce a fixed amount of heat. Thus, without some heat regulating mechanism (like the fusible material 120), the container 100 may under heat the product 106 if the initial temperature is below ideal, and may overheat the product 106 if the starting temperature is above ideal. It is generally desirable, therefore, to limit the amount of heat transferred to the food product to just that necessary for palatability. Otherwise, since the chemical heater has initially a fixed amount of total heat energy available, the food product will be either too hot or too cold depending upon the starting temperature. In a typical implementation, the fusible material 120 helps perform this function.

As shown in FIG. 1, the wax ring 120 is at a position in the self-heating container 100 such that when the product 106 reaches the desired, target temperature and the wax ring 120 begins to melt, the wax ring releases from the outer surface of the inner cup 102, drops into the exothermic reaction and at least partially quenches or suppresses the exothermic reaction. In a typical implementation, after the product has reached the desired target temperature, which may take anywhere from 30 seconds to 4 minutes, or, perhaps, more depending on the product being heated and the overall design of the self-heating container 100, the heated product 106 made be consumed and enjoyed.

In some implementations, before activation, there is a small opening in the soluble material (i.e., the soluble container 114) covered by a patch that is permeable to the second substance 112 and substantially impermeable to the first substance 110. In implementations that include the small opening/patch, once the frangible membrane 116 is ruptured and the second substance 112 reaches the soluble container 114, some of the second substance 112 begins dissolving the soluble container 114 and some of the second substance 112 flows through the patch to start exothermically reacting with the first substance 110 inside the soluble container 114. In a typical implementation, heat from this initial bit of exothermic reacting not only starts to contribute to heating of the product 106, but also helps expedite dissolution of the soluble container 114.

Figure 2:
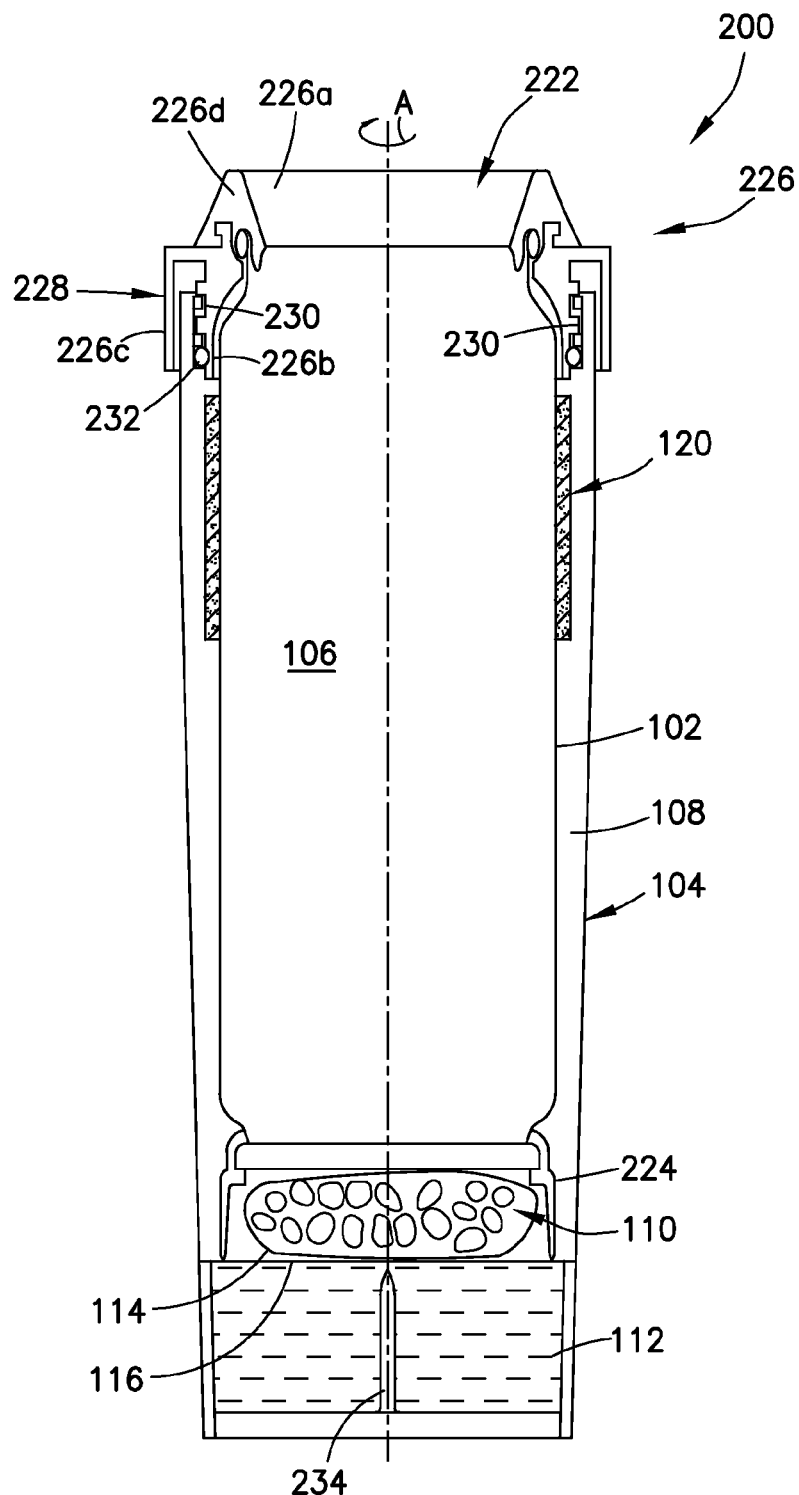
FIG. 2 is a partial, cross-sectional side view of another exemplary implementation of a self-heating container.

FIG. 2 is a partial, schematic cross-sectional side view of another exemplary implementation of a self-heating container 200.

The self-heating container 200 of FIG. 2 is similar to the self-heating container 100 of FIG. 1 in that the self-heating container 200 of FIG. 2 has an inner cup 102 holding a product 106 to be heated, and an outer cup 104 that surrounds at least part of the inner cup 102, a removable cover 222 at the upper open end of the inner cup 102 sealing the inner product compartment, a space 108 between the inner cup 102 and the outer cup 104 that accommodates an exothermic chemical reaction, a first substance 110 in a soluble container 114 just below the inner cup 102, a second substance 112 physically separated from the soluble container 114 by a frangible membrane 116, a means for rupturing the frangible membrane (not shown in FIG. 1, but see 224 in FIG. 2), and a fusible material 120 with reaction suppressant adhered to a surface of the inner cup 102 in the reaction space 108.

The means for rupturing the frangible membrane in the self-heating container 200 of FIG. 2 is a cutter 224. In the illustrated implementation, the cutter 224 is rigidly secured to a bottom end of the inner cup 106 and extends in an axially downward direction toward the frangible membrane 116. A distal (bottom) edge of the cutter 224 is a cutting edge. The cutter 224 and the distal cutting edge of the cutter 224 can have any one of a variety of possible configurations. As one example, the cutter 224 is substantially annular and the distal edge of the cutter 224 is serrated around a perimeter of the annular cutter 224. In another example, the cutter 224 includes a plurality of downward projections, each having a sharp distal edge. A variety of other configurations are possible. In a typical implementation, the cutter 224 is arranged substantially as shown (i.e., so that it can cut through the frangible membrane 116 near an outer perimeter of the frangible membrane 116).

There is an annular coupling element 226 at the upper, circumferential edge of the self-heating container 200. In a typical implementation, the annular coupling element 226 seals the space 108 between the inner cup 102 and the outer cup 104, enables a human user to easily rotate the inner cup 102 relative to the outer cup 104 about a concentric axis A, and causes the inner cup 102 (and the attached cutter 224) to move in an axially downward direction relative to the outer cup 104, toward and through the frangible seal 116, as the inner cup 102 rotates.

The illustrated coupling element 226 includes a first portion 226a that is rigidly secured to the inner cup 102, a second portion 226b that extends in a downward direction between the inner cup 102 and the outer cup 104, a third portion 226c that is outside the outer cup 104 and defines an outwardly-facing, annular gripping surface 228 and a fourth portion 226d that defines a sip lip.

In a typical implementation, the first, second and third portions of the coupling element are formed as one integrated piece and the fourth portion of the coupling element is a separate piece that clips onto the integrated piece and connects to the inner cup 102. As shown, the fourth portion essentially secures the inner cup 102 to overall assembly.

There are mating screw threads 230 on the inner surface of the outer cup 104 and on the outer surface of the second portion 226b of the coupling element 226. These mating screw threads 230 are configured in a manner that causes the inner cup 102 to move in an axially downward direction relative to the outer cup 104 when the inner cup 102 is rotated about the concentric axis A relative to the outer cup.

A sealing element 232, which in the illustrated implementation is an O-ring, is positioned between the inner surface of the outer cup 104 and an outer surface of the second portion 226b of the coupling element 226. In the illustrated implementation, the sealing element 232 is below the mating screw threads 230. However, in other implementations, the sealing element 232 may be above the mating screw threads 230.

In some implementations, there is a removable tear tab (not shown in FIG. 2) that generally prevents a user from rotating the inner cup 102 relative to the outer cup 104 unless and until the tear tab is removed.

To initiate heating in the illustrated self-heating container 200, a human user would remove the tear tab (if present) and, holding the outer surface of the outer cup 104 and the gripping surface 228, would rotate the coupling element 226 (and, therefore, the inner cup 102) relative to the outer cup 104. This would cause the inner cup 102, while rotating, to move in an axially downward direction relative to the outer cup 104. Eventually, the rotation and axially downward motion of the inner cup 102 would cause the cutter 224, which moves with the inner cup 102, to cut through or rupture the frangible membrane 116.

Once the frangible membrane 116 has been ruptured, the weight of the first substance 110, in the soluble container 114, bears down on the ruptured frangible membrane to help press the liquid second substance 112 out from underneath the ruptured frangible membrane 116 using gravity.

As the exothermic reaction continues, the soluble container 114 continues to dissolve, exposing more and more of the first substance 110 to the second substance 112, which increases heat generation. In general, during the initial stages of the exothermic reaction at least, the more intermixing and contact that occurs between the first substance 110 and the second substance 112, the more heat is generated by the resulting exothermic reaction. Moreover, in some implementation, increased heat from the exothermic reaction can accelerate the rate at which the soluble container 114 dissolves.

Referring again to FIG. 2, there is a piercing element 234 in the space beneath the frangible membrane 116. In a typical implementation, the piercing element is a rigid, elongate structure with a sharp tip that points upward and is near the frangible membrane. In the illustrated implementation, the piercing element extends in an upward direction from the inner bottom surface of the outer cup 104.

In a typical implementation, after the frangible membrane 116 is ruptured, if the human user continues to rotate the inner cup 102 relative to the outer cup 104, the inner cup 102 will continue to move in the axially downward direction relative to the outer cup 104. Eventually, the outer bottom surface of the inner cup pushes the soluble container 114, if any is still intact, onto the piercing element 234. If the soluble container 114 is still at least partially intact, contact with the piercing element 234 further compromises its structural integrity to facilitate more exposure of the granular first reactant to the liquid second reactant.

The exothermic reaction continues, producing heat in the reaction space 108. Heat from the exothermic chemical reaction passes through the thermally-conductive inner cup 102 of the self-heating container 100 to the product 106 contained therein. This causes the temperature of the product 106 to increase. Eventually, the product reaches a desired, target temperature. In the illustrated implementation, the self-heating container 200 has a fusible material 120 that, as discussed above, is specifically adapted to temper or quench the exothermic reaction when the product reaches the desired target temperature so that the product temperature does not increase to undesirable or potentially hazardous temperature levels.

Figure 3:
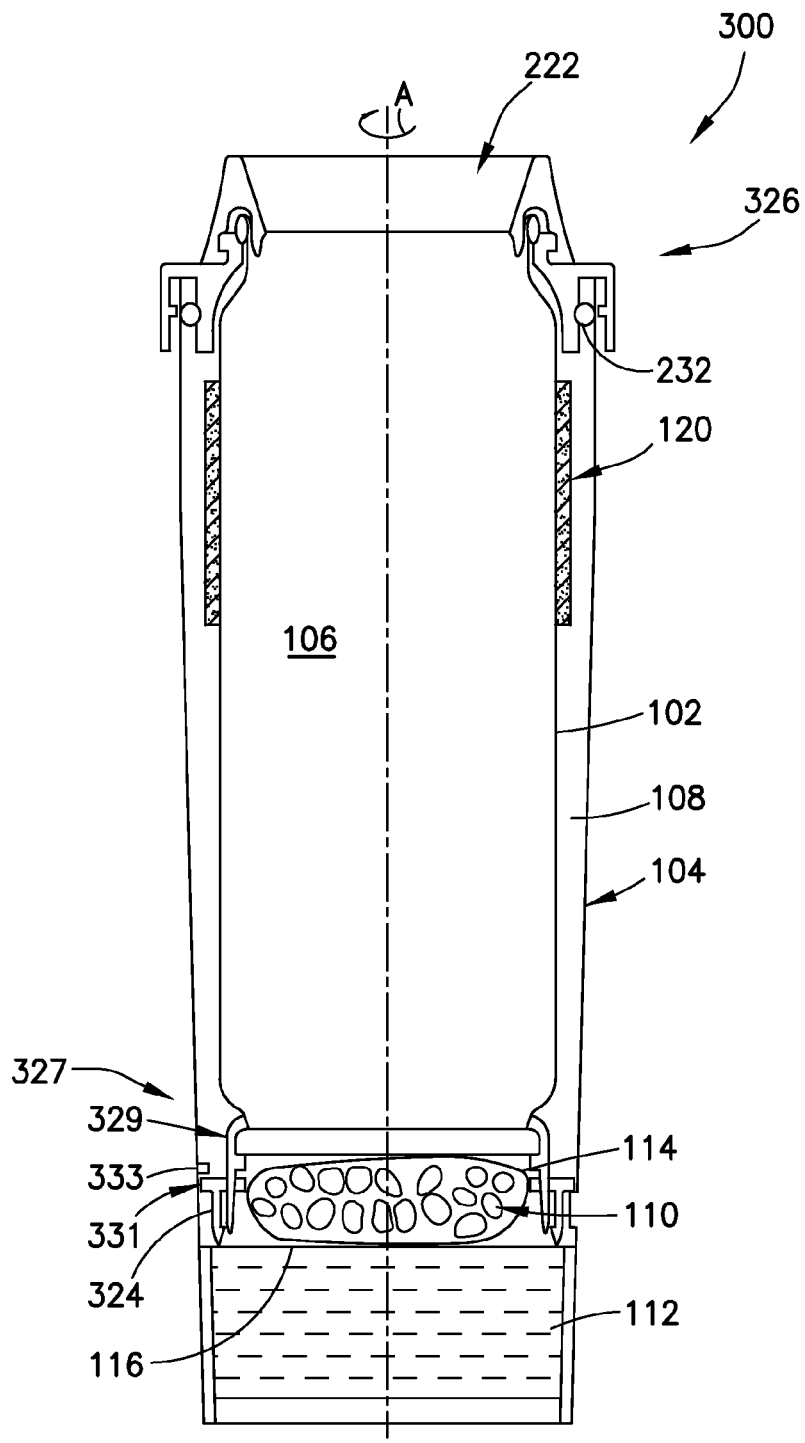
FIG. 3 is a partial, cross-sectional side view of yet another exemplary implementation of a self-heating container.

FIG. 3 is a partial, schematic cross-sectional side view of another exemplary implementation of a self-heating container 300.

The self-heating container 300 of FIG. 3 is similar to the self-heating container 100 of FIG. 1 in that the self-heating container 300 of FIG. 3 has an inner cup 102 holding a product 106 to be heated, and an outer cup 104 that surrounds at least part of the inner cup 102, a removable cover 222 at the upper open end of the inner cup 102 sealing the inner product compartment, a space 108 between the inner cup 102 and the outer cup 104 that accommodates an exothermic chemical reaction, a first substance 110 in a soluble container 114 just below the inner cup 102, a second substance 112 physically separated from the soluble container 114 by a frangible membrane 116, a means for rupturing the frangible membrane (not shown in FIG. 1, but see 324 in FIG. 3), and a fusible material 120 with reaction suppressant adhered to a surface of the inner cup 102 in the reaction space 108.

Moreover, there is an annular coupling element 326 at the upper, circumferential edge of the self-heating container 300. The annular coupling element 326 is very similar to the annular coupling element 226 in the self-heating container 200 of FIG. 2. In this regard, the annular coupling element 326 seals, with O-ring 232, the space 108 between the inner cup 102 and the outer cup 104 and enables a human user to easily rotate the inner cup 102 relative to the outer cup 104 about a concentric axis A.

The annular coupling element 326 is only shown on one side (the right side) of the upper circumferential edge in FIG. 3. It should be understood, however, that the annular coupling element 326 actually extends around the entire perimeter of the upper circumferential edge and, if shown in its entirety in FIG. 3, would appear on the left side of the upper circumferential edge as a mirror image of the portion of the annular coupling element 326 that is shown.

Unlike the self-heating container 200 in FIG. 2, the self-heating container 300 in FIG. 3 does not have any mating screw threads or other structural features that cause the inner cup 102 to move in an axially downward direction as the inner cup 102 rotates. Indeed, the inner cup 102 in the self-heating container 300 of FIG. 3 is able to rotate about concentric axis A relative to the outer cup 104, but does not experience any significant axial motion relative to the outer cup 104 as it rotates.

In the self-heating container 300 of FIG. 3, there is a drive down cam assembly 327 that includes one or more paddles 329, a circular punch (or cutter) element 324, and threads or a cam surface 333 on the inner surface of the outer cup 104. The one or more paddles 329 are rigidly fastened to a bottom portion of the inner cup 102 and, therefore, rotate about axis A when the inner cup rotates. The one or more paddles 329 are coupled to the circular punch element 324 such that the circular punch element 324 rotates about axis A with the one or more paddles 329 when the one or more paddles 329 rotate about axis A. Additionally, the one or more paddles 329 are coupled to the circular punch 324 so as to allow the circular punch element 324 to move, at least in an axially downward direction relative to the frangible membrane 116 as the circular punch element 324 rotates about axis A.

Moreover, the circular punch element 324 has an outwardly projecting portion 331 that engages either the screw thread or cam feature 333 on the inner surface of the outer cup 104. The screw thread or cam feature 333 is configured to positively drive the circular punch element 324 in an axially downward direction toward and through the frangible membrane 116 as the circular punch element 324 rotates.

In the illustrated implementation, the means for rupturing the frangible membrane is the circular punch element 324 that includes a distal cutting edge that points in an axially downward direction. The distal cutting edge can be flat, serrated or otherwise contoured to cut or tear through the frangible membrane 116.

Figure 4:
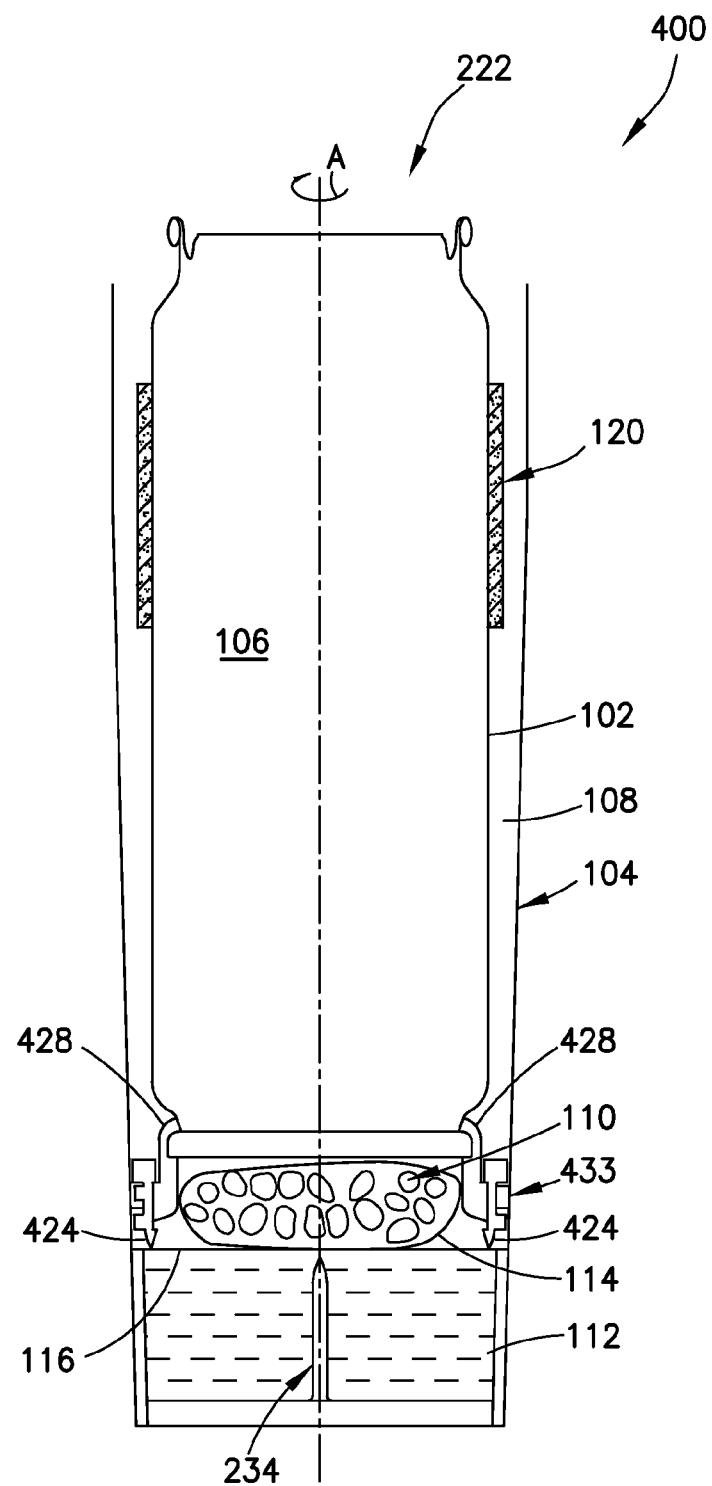
FIG. 4 is a partial, cross-sectional side view of still another exemplary implementation of a self-heating container.

FIG. 4 is a partial, schematic cross-sectional side view of another exemplary implementation of a self-heating container 400.

The self-heating container 400 of FIG. 4 is similar to the self-heating container 100 of FIG. 1 in that the self-heating container 400 of FIG. 4 has an inner cup 102 holding a product 106 to be heated, and an outer cup 104 that surrounds at least part of the inner cup 102, a removable cover 222 at the upper open end of the inner cup 102 sealing the inner product compartment, a space 108 between the inner cup 102 and the outer cup 104 that accommodates an exothermic chemical reaction, a first substance 110 in a soluble container 114 just below the inner cup 102, a second substance 112 physically separated from the soluble container 114 by a frangible membrane 116, a means for rupturing the frangible membrane (not shown in FIG. 1, but see 424 in FIG. 4), and a fusible material 120 with reaction suppressant adhered to a surface of the inner cup 102 in the reaction space 108.

Although not shown in FIG. 4, in a typical implementation, the self-heating container 400 in FIG. 4 can include an annular coupling element (similar to annular coupling element 326 in FIG. 3) at the upper, circumferential edge of the self-heating container 400. The annular coupling element would enable a human user to easily rotate the inner cup 102 relative to the outer cup 104 about a concentric axis A without causing any substantial axial displacement of the inner cup 102 relative to the outer cup 104.

The illustrated self-heating container 400 has one or more cutter drive paddles 428 rigidly coupled to a lower portion of the inner cup 102. The cutter drive paddles 428 extend substantially in an axially downward direction from the lower portion of the inner cup 102.

A cutter 424 is engaged to a distal end of the cutter drive panel(s) 428. In a typical implementation, the cutter 424 is an annular cutting device with an axially downward facing cutting edge. The cutter drive panels 428 are engaged to the cutter 424 in a manner that causes the cutter 424 to rotate with cutter drive panel(s) 428 and allows for the cutter 424 to move in an axially downward direction relative to the cutter drive panel(s) 428 when it rotates. The cutter 424 has external screw threads or other structure(s) that mate with corresponding internal screw threads or cam structure (see 433) on an inner surface of the outer cup 104. When the cutter 424 rotates about axis A relative to the outer cup 104, the mating screw threads cause the cutter 424 to move in an axially downward direction to and eventually through the frangible membrane 116.

The self-heating container in FIG. 3 also has a piercing element (similar to piercing element 234 in the self-heating container 100 of FIG. 1) in the space beneath the frangible membrane 116.

Figure 5:
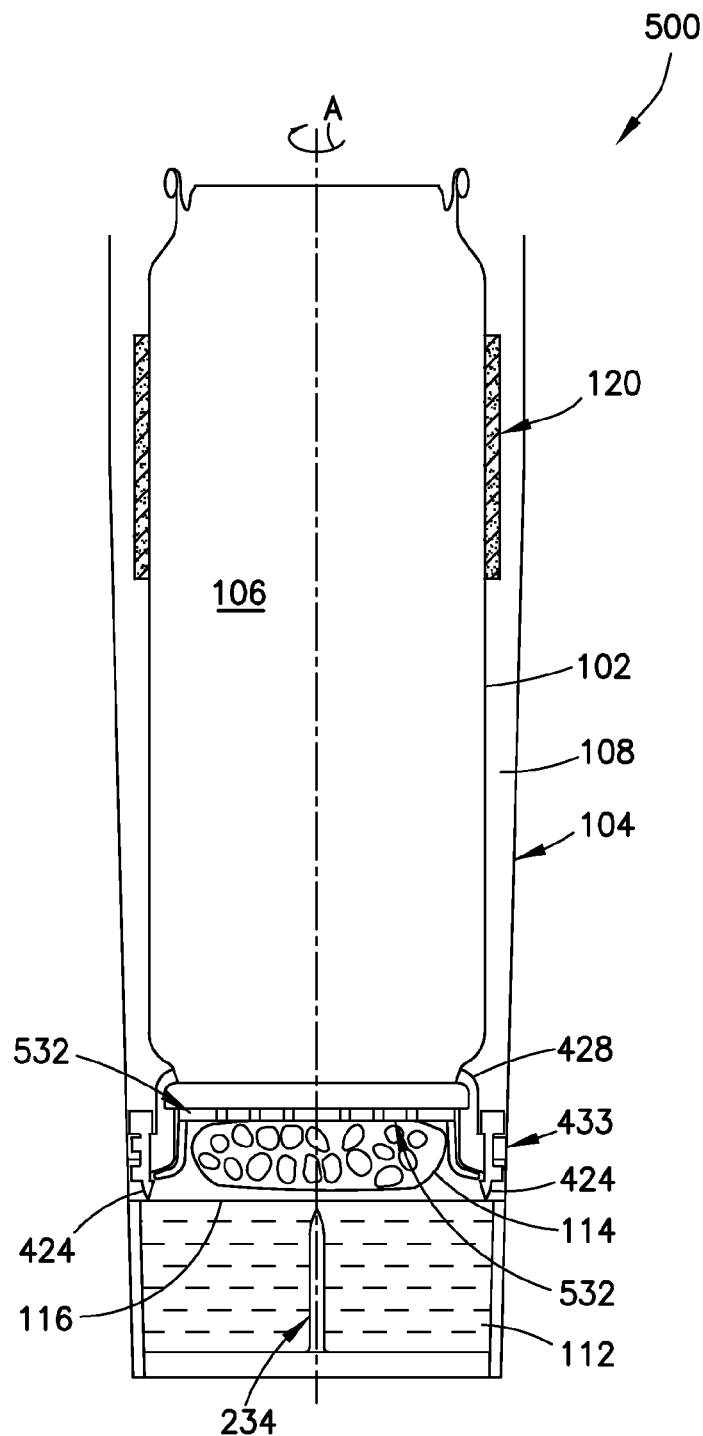
FIG. 5 is a partial, cross-sectional side view of yet another exemplary implementation of a self-heating container.

FIG. 5 is a partial, schematic cross-sectional side view of another exemplary implementation of a self-heating container 500.

The self-heating container 500 of FIG. 5 is very similar to the self-heating container 400 of FIG. 4, except the self-heating container 500 of FIG. 5 also has a fitment 532 coupled to the means for rupturing the frangible membrane (i.e., cutter 424) and arranged such that as the cutter 424 moves in the axially downward direction past the frangible membrane 116, the fitment 532 moves in the axially downward direction also, pushing the soluble container 114 toward the second substance 112. More particularly, the fitment 532 is configured such that, after the cutter 424 has ruptured frangible membrane 116, continued rotation of the inner cup 102 about the concentric axis A relative to the outer cup 106 causes further axially downward motion of the fitment 532 relative to the outer cup 104 to push the soluble container 114 onto the piercing element 234.

The fitment 532 in the illustrated implementation is a cage-like structure. However, various other configurations are possible for the fitment 532. For example, the fitment 532 can be a net-like structure, a solid plate, a pole, etc.

Figure 6:
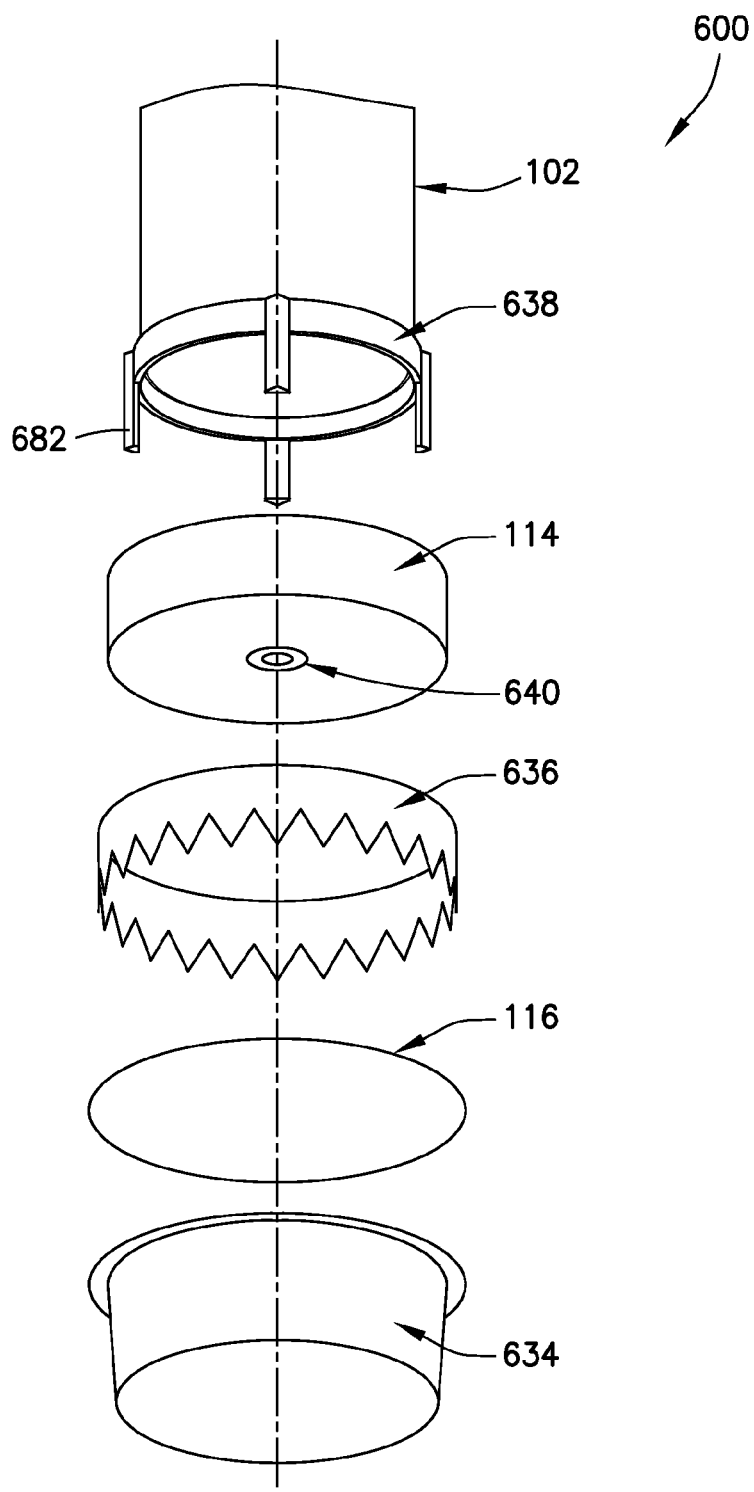
FIG. 6 is a partial, exploded, perspective view showing some components of an exemplary implementation of a self-heating container.

FIG. 6 is an exploded view showing a few components of yet another exemplary self-heating container 600.

The components shown in the illustrated implementation include an inner cup 102 to hold a product to be heated, a soluble container 114 containing a granular first reactant, a vessel 634 for holding the liquid second reactant, a frangible membrane 116 for sealing the vessel 634, and a means for rupturing a frangible membrane, which, in the illustrated example is an annular ring 636 with a downward facing saw toothed cutting edge. There is a drive ring 638 coupled to a lower portion of the inner cup 102. The drive ring 638 has a plurality of extensions 682 that are configured to engage and drive the annular cutting ring 636.

There is a patch 640 in the bottom surface of the soluble container 114. The patch 640 covers an opening in the soluble container 114 and is permeable to the liquid second reactant and substantially impermeable to the granular first reactant. During operation of the self-heating container 600, the patch 640 allows a greater amount of the liquid second reactant to access to the granular first reactant sooner than it otherwise would. In a typical implementation, this produces faster heating than would occur if the soluble container 114 needed to dissolve before heating could begin.

The patch 640 can have any one of a variety of possible configurations. In one example, the patch 640 is a porous material with a pore size that allows liquid to pass but prevents the granular material from passing. Typically, the patch 640 should have adequate physical strength for its intended role. Moreover, its pores should be small enough to retain the granular material, and it should be easily wetted by the liquid reactant. Materials such as those employed in a common tea bag may be suitable. The patch 640 can be adhered over the hole in the soluble container 114 by means of a self-adhesive ring or a heat seal. As long as the patch and its adhering ring are small enough that they do not block circulation of the reactants, any potential deleterious effects of the insoluble material in the reaction milieu will be minimal. An alternative to the use of a tea bag-like material would be to perforate the soluble film in a small area (or multiple small areas) to allow intrusion of the liquid material upon startup.

The granular materials in the soluble bag may be sensitive to moisture, adhering into a cake if exposed to humidity over a length of time. These cakes are somewhat porous, and will react with the liquid second reactant, but will initially slow the reaction so the startup is prolonged. In some implementations, the self-heating container 600 may have a vent opening (e.g., in the outer cup), which could allow moisture into the reaction space. To prevent this moisture from intruding into the granular material through the patch 640, which could cause caking of the granules, the patch 640 can be placed on the bottom of the soluble container, as shown in FIG. 6, so that it lies against the frangible membrane. Since soluble container 114 is usually a plastic film with a high degree of flexibility, it will press tightly against the frangible membrane 116. This arrangement effectively prevents intrusion of moisture into the granules.

Figure 7A:
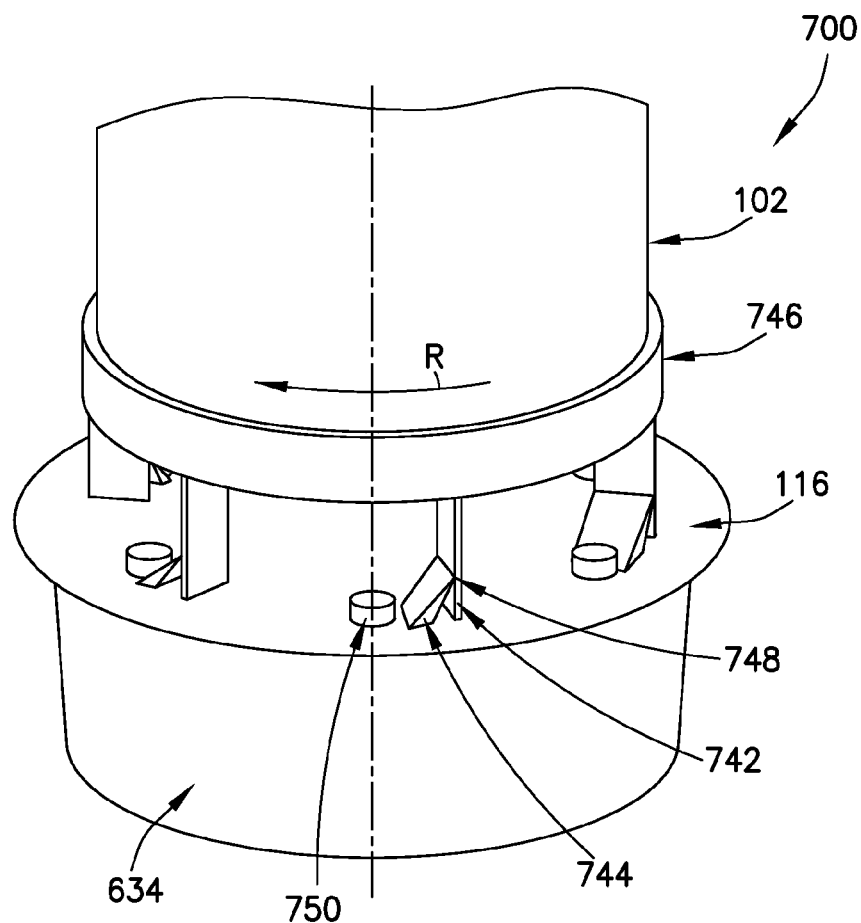
FIG. 7A is a partial, perspective view of an exemplary implementation of a self-heating container.
Figure 7B:
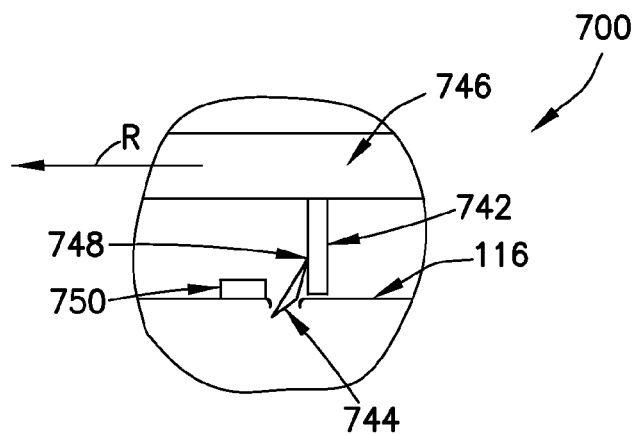
FIG. 7B is a detail showing part of the self-heating container in FIG. 7A with a tooth having pivoted into a frangible membrane.

FIGS. 7A and 7B show an alternative means for rupturing a frangible seal 116 on a vessel 634 containing the liquid second reactant in yet another exemplary self-heating container 700.

The illustrated implementation includes a plurality of protrusions 750 on an upper surface of the frangible membrane 116 that faces the means for rupturing the frangible membrane. These protrusions 750 can be made from a variety of possible materials. In one example, the protrusions are dried glue dots.

The means for rupturing the frangible membrane in the illustrated implementation includes teeth 744, each of which is connected by a hinge 748 to a corresponding one of a plurality of support members 742. Each support member 742 is rigidly coupled to the inner cup 102 (e.g., by a ring 746 structure pressed onto the bottom end of the inner cup 102) and extends in an axially downward direction toward the frangible seal 116. The inner cup in the illustrated implementation is rotatable (as indicated by arrow R), but does not experience any significant movement in an axial direction. Each tooth 744 is positioned so that it can slides along or very close to the upper surface of the frangible membrane 116 as the inner cup 102 rotates. Moreover, each tooth is coupled to a leading face of its support members (i.e., the face that leads the movement when the inner cup 102 is rotated in the direction indicated (by arrow R) to cause rupturing of the frangible membrane 116). Eventually, when a tooth reaches one of the protrusions 750 and the inner cup 102 continues to rotate, the tooth rotates about its hinge into and through the frangible membrane. FIG. 7B shows an exemplary one of the teeth after it has pivoted about its hinge through the frangible membrane 116. Further rotation of the inner cup 102 beyond that point, causes further tearing of the frangible membrane 116.

Figure 8:
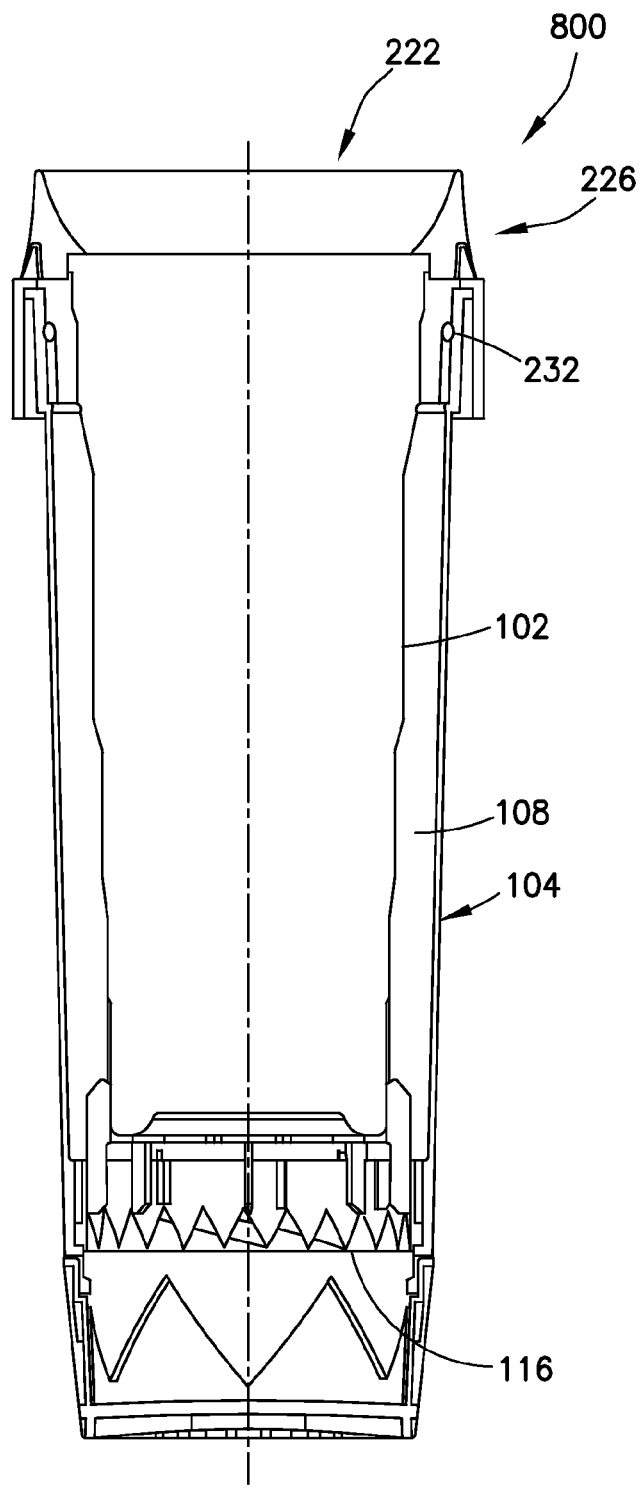
FIG. 8 is a partial, cross-sectional side view of an exemplary implementation of a self-heating container.

FIG. 8 is a partial, cross-sectional side view of an exemplary implementation of a self-heating container 800 that is similar to the self-heating container 200 in FIG. 2.

Like the self-heating container 200 of FIG. 2, the self-heating container 800 of FIG. 8 has an inner cup 102 holding a product 106 to be heated, and an outer cup 104 that surrounds at least part of the inner cup 102, a removable cover 222 at the upper open end of the inner cup 102 sealing the inner product compartment, a space 108 between the inner cup 102 and the outer cup 104 that accommodates an exothermic chemical reaction, a first substance in a soluble container (not shown in FIG. 8) just below the inner cup 102, a second substance physically separated from the soluble container by a frangible membrane 116, a means for rupturing the frangible membrane, an annular coupling element 226 at the upper, circumferential edge of the self-heating container 800 and a sealing element 232.

A number of embodiments of the invention have been described. Nevertheless, it will be understood that various modifications may be made without departing from the spirit and scope of the invention.

For example, different features from the different implementations described herein can be combined in a number of ways. Likewise, certain features from some of the implementations described herein can be omitted. For example, the fusible material and/or the piercing element may be omitted from certain implementations described herein that include one or more of those elements. Moreover, the relative size and positioning of the various components can vary considerably. For example, the granular reactant in the soluble container could be below the liquid reactant.

The different components of the self-heating container implementations can be made using a wide variety of different materials. Likewise, the reactants to produce the exothermic reaction can be different types of reactants.

In one implementation, the bottom of the self-heating container has two plastic pouches. The lower pouch in this example contains the liquid component of the chemical reaction, while the upper pouch, which is water soluble, contains the second reactant, which is a granular (e.g., powdered, pelletized, etc. solid) reactant. In some implementations, the solid reactant may include coated potassium permanganate and the liquid component (or liquid reactant) may include glycerine. Examples of these types of formulations are described, for example, in the applicant's, Tempra Technology, Inc., own U.S. Patent Application Publication No. 2008/0245358. Other reactants and combinations of reactants are possible as well.

The solvent in the liquid reactant can be water or virtually any other type of solvent. A variety of additives can be included with one or more of the reactants.

Moreover, in a typical implementation, the self-heating container includes a vent system that allows air to exit the heater portion (e.g., reaction space) of the container. If more heat is evolved in the reaction than can be absorbed into the food container, steam may also be vented to prevent pressure buildup in the self-heating container.

The fusible material can vary, details of which may be disclosed in the applicant's, Tempra Technology, Inc., own US Patent Application Publication No. US20100239877.

Finally, this document uses a number of relative terms, such as "lower," "upper," "horizontal," "vertical,", "above", "below" "up", "down", "top" and "bottom" as derivative thereof (e.g., "horizontally" "downward," "upward," etc.). In general, these relative terms, and their derivatives, should be understood as referring to the objects and relative positions of the arrangements and components having the orientations shown in the particular drawings being discussed. Unless otherwise indicated, relative terminology should not be construed as limiting in any particular way.

Other implementations are within the scope of the claims.

What is claimed is:

1. A self-heating container comprising:
an inner cup;
an outer cup, wherein the inner cup is at least partially inside the outer cup to define a space between the inner cup and the outer cup, wherein the space contains:
a granular first substance and a liquid second substance that are adapted to produce an exothermic reaction upon contact with each other,
a soluble container or bag containing and completely surrounding the granular first substance, wherein the soluble container or bag is made entirely of a soluble material;
a frangible membrane physically separating the liquid second substance from the soluble container or bag; and
a means for rupturing the frangible membrane, wherein the means for rupturing the frangible membrane comprises an annular ring with a downward-facing saw toothed cutting edge,
wherein the means for rupturing the frangible membrane is coupled to the inner cup,
wherein the inner cup is configured to rotate about a concentric axis relative to outer cup, and
a cam or a screw thread configured to cause the inner cup to move in an axially downward direction relative to the outer cup as the inner cup is rotated about the concentric axis relative to the outer cup, and
a drive ring coupled to a lower portion of the inner cup, wherein the drive ring has a plurality of extensions that are configured to engage and drive the annular ring.

2. The self-heating container of claim 1, wherein the liquid second substance is or comprises a solvent for the soluble container or bag such that the soluble container or bag is adapted to dissolve upon contact with the liquid second substance.

3. The self-heating container of claim 1, wherein the means for rupturing the frangible membrane is responsive to a user's manipulation of the self-heating container by hand, and
wherein rupturing the frangible membrane compromises the physical separation between the liquid second substance and the soluble container or bag, thereby enabling the liquid second substance to contact the soluble container or bag.

4. The self-heating container of claim 3, wherein the liquid second substance contacting the soluble container or bag causes the soluble container or bag to dissolve,
wherein dissolving the soluble container or bag enables the liquid second substance to contact the granular first substance to thereby produce the exothermic reaction.

5. The self-heating container of claim 1, wherein the soluble container or bag containing the granular first substance is above the liquid second substance when the frangible membrane is intact and the self-heating container is in an upright configuration.

6. The self-heating container of claim 1,
wherein the granular first substance, the liquid second substance, the soluble container or bag, the frangible membrane, and the means for rupturing the frangible membrane are located in the space between the inner cup and the outer cup, and
wherein the exothermic reaction occurs in the space between the inner cup and the outer cup.

7. The self-heating container of claim 1, wherein as the inner cup is rotated about the concentric axis relative to the outer cup and moves in the axially downward direction relative to the outer cup, the means for rupturing the frangible membrane rotates about the concentric axis and moves in an axially downward direction toward and through the frangible membrane.

8. The self-heating container of claim 7, wherein the inner cup is configured such that, after the means for rupturing the frangible membrane has moved through the frangible membrane, continued rotation of the inner cup about the concentric axis relative to the outer cup causes the inner cup to push the soluble material into the second substance.

9. The self-heating container of claim 7, further comprising:
a piercing element,
wherein the inner cup is configured such that, after the means for rupturing the frangible membrane has moved through the frangible membrane, continued rotation of the inner cup about the concentric axis relative to the outer cup causes further axially downward motion of the inner cup relative to the outer cup to push the soluble material onto the piercing element.

10. The self-heating container of claim 1, wherein the frangible membrane is not soluble in the liquid second substance.

11. A method of heating a product, the method comprising:
providing a self-heating container, the self-heating container comprising:
an inner cup containing a product to be heated;
an outer cup, wherein the inner cup is at least partially inside the outer cup to define a space between the inner cup and the outer cup, wherein the space between the inner cup and the outer cup contains:
a granular first substance and a liquid second substance that are adapted to produce an exothermic reaction upon contact with each other,
a soluble container or bag containing and completely surrounding the first substance, wherein the soluble container of bag is made entirely of a soluble material;
a frangible membrane physically separating the liquid second substance from the soluble container or bag; and
a means for rupturing the frangible membrane wherein the means for rupturing the frangible membrane comprises an annular ring with a downward-facing saw toothed cutting edge;
wherein the inner cup is configured to rotate about a concentric axis relative to outer cup,
a cam or a screw thread configured to cause the inner cup to move in an axially downward direction relative to the outer cup as the inner cup is rotated about the concentric axis relative to the outer cup, and
a drive ring coupled to a lower portion of the inner cup, wherein the drive ring has a plurality of extensions that are configured to engage and drive the annular ring; and
rupturing the frangible membrane by rotating the inner cup relative to the outer cup.

12. The self-heating container of claim 1, further comprising:
a fitment coupled to the means for rupturing the frangible membrane, wherein the fitment is arranged such that as the means for rupturing the frangible membrane moves in the axially downward direction, the fitment also moves in the axially downward direction pushing the soluble container toward the second substance, and
wherein the fitment is a cage-like structure, a net-like structure, or a solid plate.

13. A self-heating container comprising:
an inner cup;
an outer cup, wherein the inner cup is at least partially inside the outer cup to define a space between the inner cup and the outer cup, wherein the space contains:
a granular first substance and a liquid second substance that are adapted to produce an exothermic reaction upon contact with each other,
a soluble container or bag containing and completely surrounding the granular first substance, wherein the soluble container or bag is made entirely of a soluble material;
a frangible membrane physically separating the liquid second substance from the soluble container or bag; and
a means for rupturing the frangible membrane,
wherein the means for rupturing the frangible membrane is coupled to the inner cup,
wherein the inner cup is configured to rotate about a concentric axis relative to outer cup, and
a cam or a screw thread configured to cause the inner cup to move in an axially downward direction relative to the outer cup as the inner cup is rotated about the concentric axis relative to the outer cup; and
a patch in a bottom surface of the soluble container or bag, wherein the patch covers an opening in the soluble container or bag and is permeable to the liquid second substance and impermeable to the granular first substance.

14. The self-heating container of claim 13, wherein the patch is a porous material with a pore size that allows the liquid second substance to pass but prevents the granular first substance from passing.

15. A method of heating a product, the method comprising:
providing a self-heating container, the self-heating container comprising:
an inner cup containing a product to be heated;
an outer cup, wherein the inner cup is at least partially inside the outer cup to define a space between the inner cup and the outer cup, wherein the space between the inner cup and the outer cup contains:
a granular first substance and a liquid second substance that are adapted to produce an exothermic reaction upon contact with each other,
a soluble container or bag containing and completely surrounding the first substance, wherein the soluble container of bag is made entirely of a soluble material;
a frangible membrane physically separating the liquid second substance from the soluble container or bag;
a means for rupturing the frangible membrane;
wherein the inner cup is configured to rotate about a concentric axis relative to outer cup,
a cam or a screw thread configured to cause the inner cup to move in an axially downward direction relative to the outer cup as the inner cup is rotated about the concentric axis relative to the outer cup; and
a patch in a bottom surface of the soluble container or bag, wherein the patch covers an opening in the soluble container or bag and is permeable to the liquid second substance and impermeable to the granular first substance; and
rupturing the frangible membrane by rotating the inner cup relative to the outer cup.

* * * * *